(12) United States Patent
Van Der Meer

(10) Patent No.: US 6,286,416 B1
(45) Date of Patent: Sep. 11, 2001

(54) COFFEE-MAKING APPARATUS

(75) Inventor: Sijtze Van Der Meer, Drachten (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/545,105

(22) Filed: Apr. 6, 2000

(30) Foreign Application Priority Data

Apr. 8, 1999 (EP) ................................................. 99201100

(51) Int. Cl.⁷ .................................................... A47J 31/00
(52) U.S. Cl. .................................. 99/293; 99/294; 99/290
(58) Field of Search .............................. 99/293, 294, 280, 99/323.1, 290

(56) References Cited

U.S. PATENT DOCUMENTS 4,137,833 * 2/1979 Yelloz ..................................... 99/293
4,565,121 * 1/1986 Ohya et al. ............................. 99/281
5,267,506 * 12/1993 Cai .......................................... 99/280
6,161,469 * 12/2000 Rolla ....................................... 99/293

FOREIGN PATENT DOCUMENTS

0797945A1  10/1997  (EP) .

* cited by examiner

Primary Examiner—Reginald L. Alexander
(74) Attorney, Agent, or Firm—Ernestine C. Bartlett

(57) ABSTRACT

A coffee-making apparatus for making normal coffee has a steam boiler (7) for generating steam for making cappuccino. The coffee-making apparatus has only one water reservoir (1) for making the coffee and for filling the steam boiler. The boiler has a venting valve (12) for automatically venting the boiler when the boiler is filled with cold water from the water reservoir. The influx of cold water into the boiler causes a sensor (12) to cool down, thereby opening a vent opening. With this apparatus it is possible to make coffee and steam for a second time, directly after making a cup of coffee and steam for the first time.

12 Claims, 1 Drawing Sheet

COFFEE-MAKING APPARATUS

BACKGROUND OF THE INVENTION

The invention relates to a coffee-making apparatus having a water reservoir, a filter device, means for heating and conveying water from the water reservoir to the filter device, and having a device for the generation of steam, comprising a steam reservoir, a water supply conduit between the water reservoir and the steam reservoir, for supplying cold water to the steam reservoir, a steam outlet conduit having a steam valve and means for heating the water in the steam reservoir.

Such a coffee-making apparatus is known from EP-A-0 797 945. In said coffee-making apparatus cold water from the water reservoir is heated in a flow heater, after which the hot water is optionally conveyed either to the filter device for brewing coffee or to the steam reservoir. In the steam reservoir steam and water are separated. The steam is fed to a steam nozzle via a pipe. The hot water flows into the bottom of the steam reservoir and then back to the flow heater, where it is heated further and is subsequently fed again to the steam reservoir. Owing to a number of restrictions and non-return valves a water circulation is obtained in order to make the water in the steam reservoir as hot as possible and build up pressure in the steam reservoir. The restrictions restrict the water flow to the flow heater in such a manner that after some time substantially all the water fed to the flow heater is discharged to the steam reservoir as steam.

In order to obtain a cup of cappucino it is required to have enough steam for making the milk frothy as soon as possible after the regular coffee has been made. In espresso machines this steam is available immediately. However, espresso machines are comparatively expensive coffee-making apparatuses. The apparatus described hereinbefore is an example of a coffee-making apparatus with which regular coffee can be made, which is subsequently turned into cappucino by means of frothed-up milk. The drawback of this known apparatus is that it takes some time before steam is available by means of which milk can be frothed up.

SUMMARY OF THE INVENTION

It is an object of the invention to make the steam for frothing up milk available as soon as possible after the coffee has been made.

To this end, the coffee-making apparatus in accordance with the invention is characterized in that the steam reservoir comprises a steam boiler having a heating element, and means have been provided for automatically venting the steam boiler when the water reservoir is filled with cold water. By means of a steam boiler having a heating element of its own steam can be generated far more rapidly than by means of the construction in accordance with EP-A-0 797 945. When the coffee-making apparatus is switched on the heating element for the boiler is also switched on. When a pot of coffee has been made the boiler is also ready for steaming. Owing to the venting facility of the boiler the boiler is automatically filled with water when the water reservoir is refilled with cold water. This means that immediately after one pot of coffee has been made another pot of coffee can be made by filling the water reservoir with cold water, upon which the boiler is vented automatically and is subsequently filled with water, as a result of which steam is available again immediately after coffee has been made.

A preferred embodiment is characterized in that the steam boiler has been provided with a temperature sensor and a venting valve which is responsive to the sensor, which sensor, on the one hand, is thermally coupled to the boiler and, on the other hand, is arranged in the proximity of a cold water supply duct of the boiler so as to make thermal contact with the cold water in the supply duct. When the heating element for the boiler is energized the housing parts of the boiler become hot. Since the sensor is in thermal contact with the housing of the boiler, the sensor responds thereto and the venting valve is closed. The temperature of the water in the boiler rises and at the boiling temperature the boiler is pressurized, as a result of which steam can be produced. By arranging the sensor close to or in a cold-water supply duct of the boiler the sensor will respond immediately to the influx of cold water, as a result of which the venting valve opens. Subsequently, the boiler is filled with water. After the influx of water into the boiler has ceased the temperature of the parts of the boiler rises again and, consequently, the temperature of the sensor also rises, as a result of which the venting valve is closed gain.

Preferably, the sensor is a memory-metal spring having an actuator, which spring is situated in the cold water supply duct of the boiler. A memory metal responds very rapidly to a temperature change, as a result of which in particular the venting valve opens rapidly, thereby enabling the boiler to be vented rapidly. However, it is obvious that other temperature sensors are also possible.

Further embodiments are defined in the Claims and in the following description with reference to the Figures.

BRIEF DESCRIPTION OF DRAWINGS

The invention will now be described in more detail with reference to an example shown in a drawing. In the drawing FIG. 1 diagrammatically shows a coffee-making apparatus having a steam boiler.

DESCRIPTION OF PREFERRED EMBODIMENTS

Figure 1:
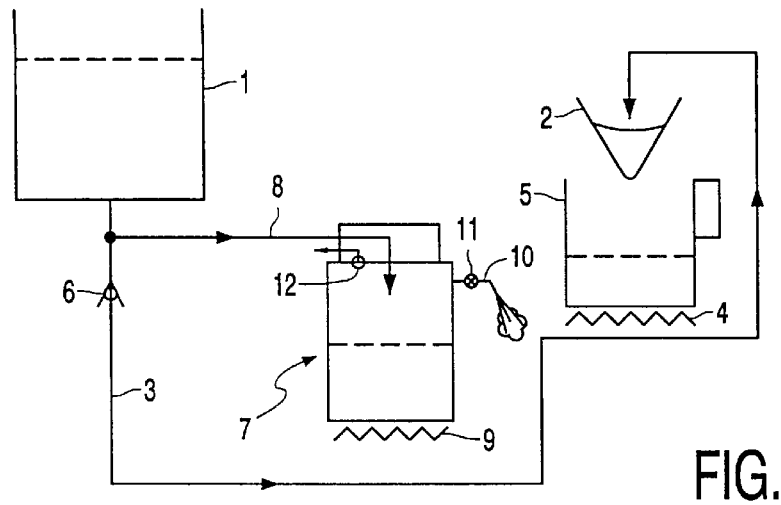

The coffee-making apparatus, as shown diagrammatically in FIG. 1, comprises a water reservoir 1 which can be filled with cold water, a filter device 2, a conduit 3 between the water reservoir and the filter device, a heating element 4 for heating the water in the conduit 3 and conveying it to the filter device, a receptacle or cup 5 for receiving coffee brew which flows out of the filter device. The conduit 3 includes a non-return valve 6, which prevents the water from being forced back to the water reservoir 1 when it is heated, as a result of which the hot water can flow to the filter device 2 only. The present apparatus is a conventional coffee-making apparatus having a so-called thermally operating pump system. For making a cup of cappucino milk should made frothy by means of steam. For this purpose, the coffee-making apparatus has a steam boiler 7, which is connected to the water reservoir 1 by means of a conduit 8. The water in the water reservoir can flow to the boiler 7 under the influence of gravity. However, it is also possible to use a pump. The boiler has a separate heating element 9 for bringing the water in the boiler rapidly to the boiling temperature. The steam produced in the boiler can be blown into the milk via a steam outlet conduit 10 having a steam valve 11, as a result of which the milk is frothed. The boiler has a venting valve 12 to allow the boiler to be filled with water.

Figure 2:
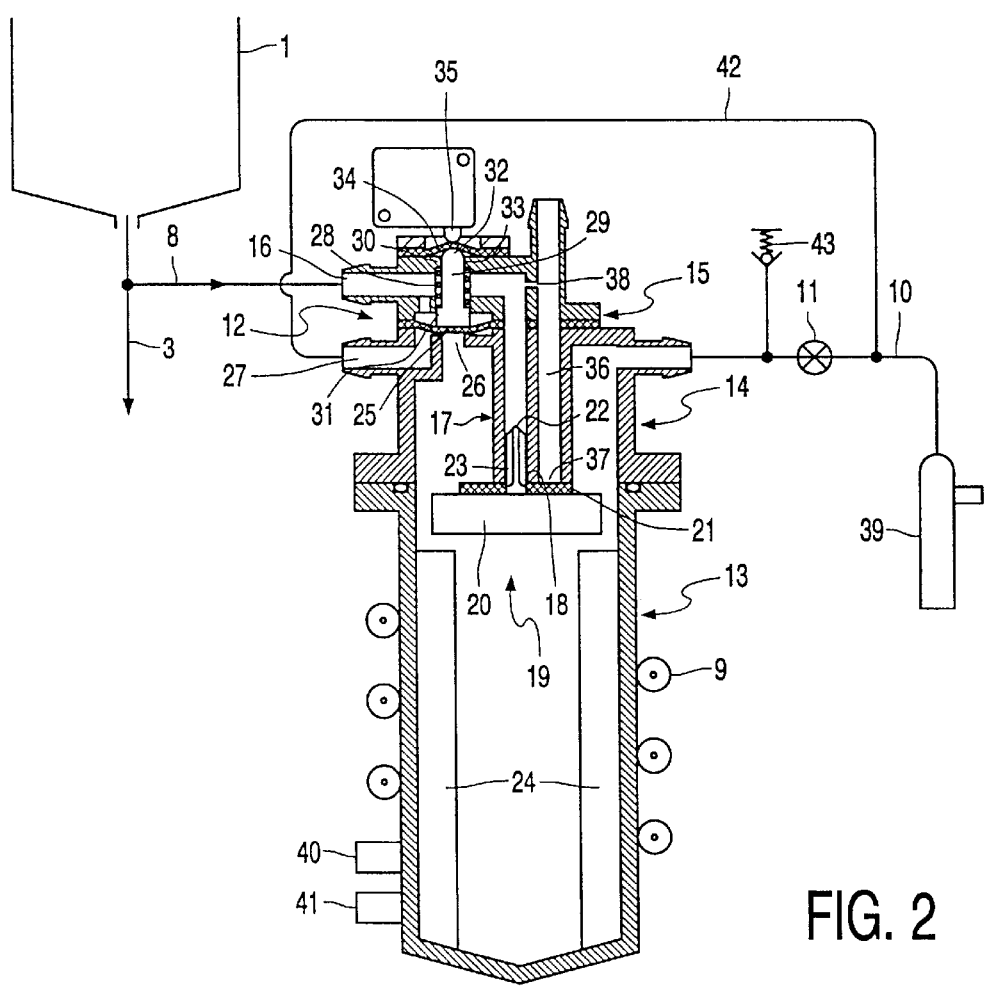
FIG. 2 is a detailed cross-sectional view of the steam boiler of FIG. 1.

The steam boiler 7 shown in FIG. 2 comprises a water drum 13 with a steam dome 14 situated above it. A fitting 15 arranged on top of the steam dome has a cold water supply duct 16 having its inlet connected to the conduit 8, which connects to the water reservoir 1. A vertical portion 17 of the supply duct opens into the water drum 13. The heating element 9 lies around the water drum 13. However, it is also possible to use other heating means. The steam outlet conduit 10 is connected to the steam dome 14. An outlet opening 18 of the cold water supply duct 16 can be closed by means of a shut-off valve 19. This shut-off valve is formed by a float 20 having a shut-off plate 21. The float carries a central pin 22, which projects into the vertical portion 17 of the supply duct. When the water level in the water drum 13 has dropped the float rests on ridges 24 in the water drum, while the pin 22 remains in the portion 17. The pin 22 has recesses 23, thus allowing water to flow into the water drum. In the upper part of the steam dome 14 the venting valve 12 is situated, which valve has a diaphragm 25 by means of which a vent opening 26 of the steam dome can be closed or left open. When the diaphragm does not close the vent opening this opening communicates with the atmosphere via a venting duct 27. The steam boiler further has a temperature sensor 28, which controls the opening and closure of the venting valve 12. For this purpose the diaphragm 25 of the venting valve carries an actuator in the form of an actuating pin 29 and the temperature sensor 28 is formed by a memory-metal spring arranged around the actuating pin. The memory-metal spring 28 and the actuating pin 29 are arranged in the cold water supply duct 16. The memory-metal spring 28 is enclosed between a wall 30 of the supply duct and a rim 31 of the actuating pin. The actuating pin and the spring leave the duct 16 open to such an extent that an adequate influx of water into the water drum 13 is guaranteed. An end portion 32 of the actuating pin 29, which end portion faces the diaphragm 25, extends through an opening 33 of the wall 30 of the supply duct beyond the fitting 15. The opening 33 is covered with a diaphragm 34, the end portion 32 of the actuating pin lying against the underside of the diaphragm 34. The upper side of the diaphragm makes contact with a switch 35, which controls the turn-on and turn-off of the heating element 9. The boiler further has a second venting duct 36 having a vent opening 37, which is opened or closed by the shut-off valve 19 simultaneously with the inlet opening 18 of the cold water supply duct. The cold water supply duct 16 further has a narrow passage 38, which opens into the second venting duct 36 and is thus in open communication with the atmosphere. Viewed in the direction of flow of the water the narrow passage is disposed downstream of the temperature sensor 28.

The coffee-making apparatus with the steam boiler operates as follows. The water reservoir 1 is filled with cold water. The water flows into the conduit 3 to the heating element 4 and the filter device 2 and into the conduit 8 to the steam boiler 7. The water drum 13 is filled with water via the supply duct 16 in the fitting 15 of the boiler. The shut-off valve 19 is open. During filling air can escape via the second venting duct 36. Air can also escape via the venting valve 12. When the water reservoir is full the float 20 shuts off the outlet opening 18 of the supply duct and the influx of water into the boiler stops. This process occurs fairly rapidly after the water reservoir has been filled. Now, first of all, normal coffee is made in the well-known manner. Both the heating element 4 for making coffee and the heating element 9 of the boiler are energized. During the coffee-brewing process the boiler is also heated. When the coffee-brewing process is ready, the boiler is also ready for the generation of steam for making the milk frothy. As the boiler is heated all parts of the boiler, i.e. including the steam dome 14 and the fitting 15, are heated through conduction of heat. The memory-metal spring 28 and actuating pin 29 become also warm. The memory-metal spring expands and urges the actuating pin 29 downward against the diaphragm 25 of the shut-off valve 12. As a result of this, the diaphragm 25 closes the vent opening 26 and the boiler is fully closed. The temperature and the pressure in the boiler rise. As a result of this, the outlet opening 18 and the vent opening 37 are sealed effectively by the shut-off valve 19. Sealing is more effective as the pressure rises. The temperature of the housing parts of the boiler also rises, as a result of which the force exerted on the diaphragm 25 by the memory-metal spring 28 via the actuating pin 29 also increases. Thus, the vent opening 26 is sealed even better. At this stage the pressure exerted on the diaphragm via the memory-metal spring should be higher than the steam pressure. When the water in the boiler begins to boil the generated steam can be blown into a cup of milk via a steam nozzle 39 in that the steam valve 11 is opened, as a result of which the milk becomes frothy. Temperature control means 40, 41 maintain the correct temperature of the boiler. If a following cup of coffee is not made immediately, the coffee-making apparatus may be turned off or is turned off automatically. The boiler cools down slowly, the steam condenses and, after a while, the pressure will again be equal to the atmospheric pressure. The float 20 is lowered onto the ridges 24, as a result of which the boiler is filled automatically when the water reservoir is filled again.

However, if another pot of coffee is made immediately after a pot of coffee has been made and subsequently steam is used for making the milk frothy, the boiler is still under pressure, as a result of which the shut-off valve 19 remains closed. Filling the boiler with water would then be impossible. However, after the water reservoir has been filled with cold water the narrow passage 38 yet allows water to flow through the supply duct 16. A small stream of water already suffices to cool down the memory-metal spring 28, as a result of which the actuating pin 29 and, as a consequence, the diaphragm 25 are moved upward. The vent opening 26 is cleared and the steam can escape from the boiler through the vent opening 27, as a result of which the boiler is depressurized. The shut-off valve 19 is lowered and opens the outlet opening 18 of the supply duct, as a result of which the boiler is again filled with water. Thus, this system enables another pot of coffee to be made and also to have steam available immediately after a pot of coffee has been made, use being made of steam for making milk frothy in order to prepare a cup of cappucino.

The heating element 9 of the boiler may remain energized during venting. The influx of cold water provides sufficient cooling of the sensor. If desired, the heating element 9 may be switched off as soon as venting takes place. For this purpose, the actuating pin 29 activates the switch 35 via the diaphragm 34, as a result of which the heating element 9 of the boiler is switched off.

As long as the water reservoir 1 is not yet empty some water will flow through the narrow passage 38. This occurs even when the boiler is filled with water and the shut-off valve 19 is closed. This water will automatically evaporate owing to the hot boiler and has no influence on the sensor.

The water that flows through the narrow passage 38 is collected in the venting duct 36. This has the advantage that as soon as the boiler has been vented and the shut-off valve 19 opens this water flows into the water drum 13. However, the water that flows through the passage 38 can also be collected in another manner, for example in a collecting tray.

The venting duct 27 can be connected to the steam outlet conduit 10 via a conduit 42. However, the connection should then be made downstream of the steam valve 11. The steam outlet conduit 10 further includes a safety valve upstream of the steam valve 11.

For making regular coffee it is alternatively possible to include a motor-driven pump in the conduit 3 instead of a thermal pump system in order to feed the water to the filter device.

What is claimed is:

1. A coffee-making apparatus having a water reservoir, a filter device, means for heating and conveying water from the water reservoir to the filter device, and having a device for the generation of steam, comprising a steam reservoir, a water supply conduit between the water reservoir and the steam reservoir, for supplying cold water to the steam reservoir, a steam outlet conduit having a steam valve and means for heating the water in the steam reservoir, wherein the steam reservoir comprises a steam boiler having a heating element, and means have been provided for automatically venting the steam boiler when the water reservoir is filled with cold water.

2. A coffee-making apparatus as claimed in claim 1, wherein the steam boiler has been provided with a temperature sensor and a venting valve which is responsive to the sensor, which sensor, on the one hand, is thermally coupled to the boiler and, on the other hand, is arranged in the proximity of a cold water supply duct of the boiler so as to make thermal contact with the cold water in the supply duct.

3. A coffee-making apparatus as claimed in claim 2, wherein the sensor comprises a memory-metal spring having an actuator, which spring is situated in the cold water supply duct of the boiler.

4. A coffee-making apparatus as claimed in claim 3, wherein the venting valve has a diaphragm whose movement is controllable by the actuator, which diaphragm can open or close a first venting duct of the boiler.

5. A coffee-making apparatus as claimed in claim 2, characterized in that one end of the cold water supply duct has been provided with a shut-off valve.

6. A coffee-making apparatus as claimed in claim 5, wherein the shut-off valve is formed by a float having a seal.

7. A coffee-making apparatus as claimed in claim 6, wherein the boiler has a second venting duct, which can be closed or opened by the shut-off valve.

8. A coffee-making apparatus as claimed in claim 6, wherein the supply duct has a narrow passage which is in open communication with the atmosphere.

9. A coffee-making apparatus as claimed in claim 8, wherein the narrow passage communicates with the second venting valve.

10. A coffee-making apparatus as claimed in claim 4, wherein the actuator causes the heating element for the boiler to be switched on and switched off.

11. A coffee-making apparatus as claimed in claim 10, wherein the actuator is an actuating pin having one end which lies against the diaphragm for the venting valve, the boiler having a second diaphragm which lies against the other end of the actuating pin, which second diaphragm actuates a switch for the heating element of the boiler.

12. A coffee-making apparatus as claimed in claim 4, wherein the first venting duct is connected to the steam outlet conduit.

* * * * *